US005756012A

United States Patent [19]
McGlashan et al.

[11] Patent Number: 5,756,012
[45] Date of Patent: May 26, 1998

[54] GAS DISSOLUTION

[75] Inventors: Stuart Roy Lauder McGlashan, East Grinstead; Stephen Bruce Harrison, London, both of England

[73] Assignee: The BOC Group plc, Windlesham, England

[21] Appl. No.: 739,779

[22] Filed: Oct. 30, 1996

[30] Foreign Application Priority Data

Oct. 31, 1995 [GB] United Kingdom ............... 9522271

[51] Int. Cl.$^6$ ............................................. B01F 3/04
[52] U.S. Cl. ...................... 261/27; 210/614; 210/96.1; 261/120; 261/DIG. 75
[58] Field of Search .................. 261/27, DIG. 75, 261/120; 210/614, 96.1

[56] References Cited

U.S. PATENT DOCUMENTS

| | | | |
|---|---|---|---|
| 3,505,213 | 4/1970 | Anthony et al. | 210/614 |
| 4,105,721 | 8/1978 | Schliebe . | |
| 4,230,571 | 10/1980 | Dadd | 261/DIG. 75 |
| 4,244,821 | 1/1981 | Molvar | 261/DIG. 75 |
| 4,308,138 | 12/1981 | Waltman | 261/DIG. 75 |
| 4,587,064 | 5/1986 | Blum | 261/DIG. 75 |
| 5,021,161 | 6/1991 | Calltharp | 210/614 |
| 5,332,502 | 7/1994 | Wickens | 210/614 |

FOREIGN PATENT DOCUMENTS

| | | |
|---|---|---|
| 0 328 444 | 6/1989 | European Pat. Off. . |
| 0 366 010 | 10/1989 | European Pat. Off. . |
| 43 40 792 | 11/1993 | Germany . |
| 1495902 | 3/1976 | United Kingdom . |
| 1238532 | 9/1981 | United Kingdom . |
| 2236103 | 9/1990 | United Kingdom . |

OTHER PUBLICATIONS

Stenstrom et al, *Water Research* vol. 15, pp. 643–654 (1981).

Daucher, *Ger. Chem. Eng.* 1(1978) pp. 282–289.

*Primary Examiner*—Tim R. Miles
*Attorney, Agent, or Firm*—R. Hain Swope; Salvatore P. Pace

[57] ABSTRACT

An apparatus for dissolving a gas in a liquid employs means for determining the alpha factor of said liquid or a parameter related thereto and control means to control the pumping rate of liquid through the apparatus in response thereto thereby maintaining the gas to liquid flow volume fraction and hence the gas dissolution efficiency within desired limits.

18 Claims, 3 Drawing Sheets

GAS DISSOLUTION

The present invention relates to an apparatus for dissolving a gas in a liquid and relates particularly, but not exclusively, to such an apparatus suitable for dissolving oxygen in water having a variable alpha factor.

BACKGROUND OF THE INVENTION

Presently known apparatus for dissolving a gas in a liquid include mobile oxygenation systems for rivers which have been used to alleviate the oxygen depletion that occurs when polluted water enters the river after periods of heavy rainfall. The apparatus comprises a barge having an air separation unit for the production of the required oxygen, a buffer vessel and a plurality of sub-atmospheric venturis through which water is pumped and into which the oxygen is injected. Oxygenated water is then passed to a sparge bar arrangement before being returned to the river. The water supply to the venturis is typically via four submersible pumps mounted in a pool in the bow of the barge. The pump outputs pass to a manifold from which a plurality of pipes supply the venturis.

The above apparatus is designed to operate at a fixed gas to water volume ratio of about 15% and makes use of all or substantially all of a constant supply of oxygen from the air separation unit. While this ratio gives reasonable dissolution efficiency in the brackish waters of the lower sections of some rivers, its efficiency in fresher upstream water is somewhat lower than might be desired. Also, in high salinity water, the fixed oxygen supply rate is not sufficient to match the water pumping rate and, hence, energy is wasted in pumping excess water.

In accordance with the present invention, an apparatus is provided for dissolving a gas in a liquid which reduces and possibly eliminates the above-mentioned problems.

BRIEF SUMMARY OF THE INVENTION

Accordingly the present invention provides an apparatus for dissolving a gas in a liquid comprising: transportation means for transporting a quantity of liquid into which said gas is to be dissolved; gas introducing means in fluid communication with the transportation means for introducing a quantity of gas into the liquid being transported; determining means for determining the alpha factor of the liquid, or a parameter related thereto; and flow varying means, for varying the ratio of gas to liquid flow in accordance with the determined alpha factor or parameter, thereby maintaining dissolution efficiency within a predetermined range.

BRIEF DESCRIPTION OF THE DRAWINGS

The accompanying drawings are illustrative of the present invention, but are not intended to limit the invention as defined by the accompanying claims.

DETAILED DESCRIPTION OF THE PREFERRED EMBODIMENT

Figure 1:
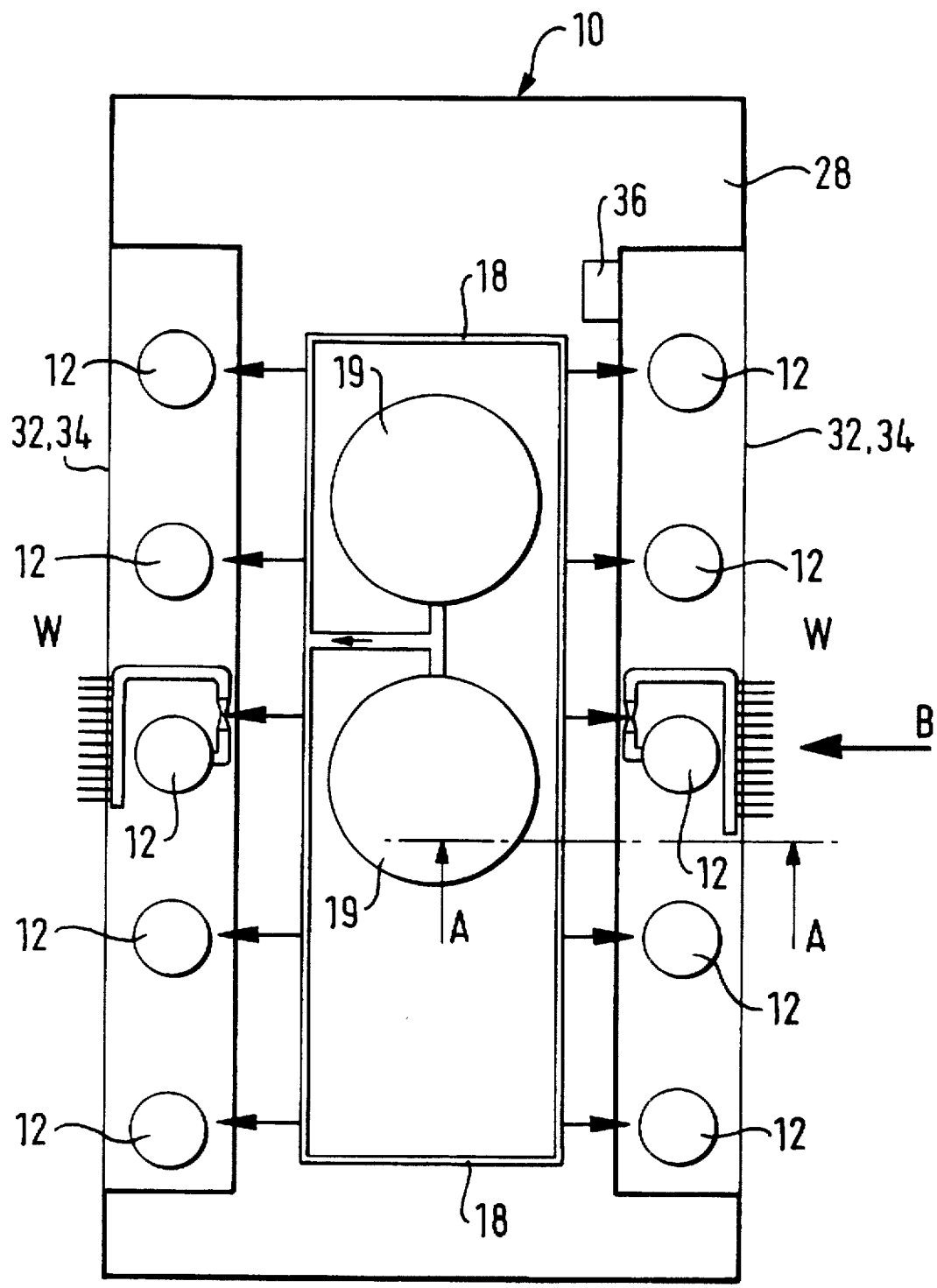
FIG. 1 is a plan view of a platform incorporating the present invention.

In accordance with the present invention, dissolution of a gas in a liquid is controlled so that dissolution efficiency may be optimized by varying the ratio of gas to liquid in accordance with a determination of the alpha factor of the liquid or a parameter related thereto. In a preferred embodiment, the ratio of gas to liquid flow is varied by adjusting the liquid flow rate. Alternatively, the ratio of gas to liquid flow is varied by adjusting the flow rate of the gas. Preferably, the flow varying means comprises means for varying the rate of one or more of the transporting means.

The term "alpha factor" of a liquid as utilised herein means the gas transfer coefficient thereof as discussed by Daucher, "Oxygen Transfer in Activated Sludge Basins of Sewage Treatment Plants", Ger. Chem. Eng. (1) pp282–289 (1978). The term "dissolution efficiently" as used herein means the ratio of the amount of gas supplied to the amount of gas dissolved and may be expressed as a percentage.

In accordance with the present invention, the means for transporting a quantity of a liquid to be treated by dissolving a quantity of a gas therein can comprise any art-recognized means for accomplishing this object, preferably a plurality of conduits for transporting the liquid, each having its own gas introducing means. In a more preferred embodiment, each conduit includes a separate pump for pumping liquid therethrough. Advantageously, the flow varying means is configured for causing one or more of said pumps to be either activated or inactivated independent of the others.

In a particularly advantageous arrangement, the gas introducing means comprises a venturi having a throat section and said gas is introduced at or adjacent the throat section. Conveniently, the gas introducing means comprises a sub-atmospheric venturi. In a preferred embodiment, the apparatus of the invention comprises multiple pairs of pump/venturi/sparge bar combinations.

Preferably, apparatus in accordance with the present invention includes a platform, typically a floating platform, upon which the pairs of pump/venturi/sparge bar combinations are mounted and in which the sparge bars of each multiple pair are positioned on opposite sides of said platform and positioned for discharging transported liquid into any liquid upon which the platform is positionable and the flow varying means is configured for simultaneous control of multiple pairs.

Advantageously, the apparatus further includes data storage means for storing data on various liquids to be treated by gas injection and comparison means for comparing the determined alpha factor with stored data, thereby to determine the required flow rate of liquid through the apparatus. Such determining means typically includes means for measuring the total dissolved or undissolved solids concentration of the liquid. Alternatively, the determining means includes means for measuring the conductivity of the liquid.

In a particularly useful arrangement the apparatus is configured for the injection of oxygen into a stream comprising mainly water. The present invention lends itself to use in combination with an air separation device of the pressure swing adsorption (PSA) type which functions as a source for the oxygen.

The present invention will be illustrated with reference to the drawings utilizing the pumping of oxygen into water, e.g. a river. Turning now to FIG. 1, the present apparatus 10 comprises one or more pumps 12 for drawing liquid into a transportation means in the form of one or more liquid conduits 14, each of which is provided with a gas introducing means in the form of, for example, a venturi 16. Gas, for example oxygen, is produced by air separation and distributed to each of the gas introducing means 16 via a ring-main 18. While it will be appreciated that the oxygen may be produced by any one of a number of separation processes, it has been found that separation in a pressure swing adsorption (PSA) apparatus 19 is particularly convenient for use with the present apparatus 10 for reasons to be explained in detail later herein.

Figure 2:
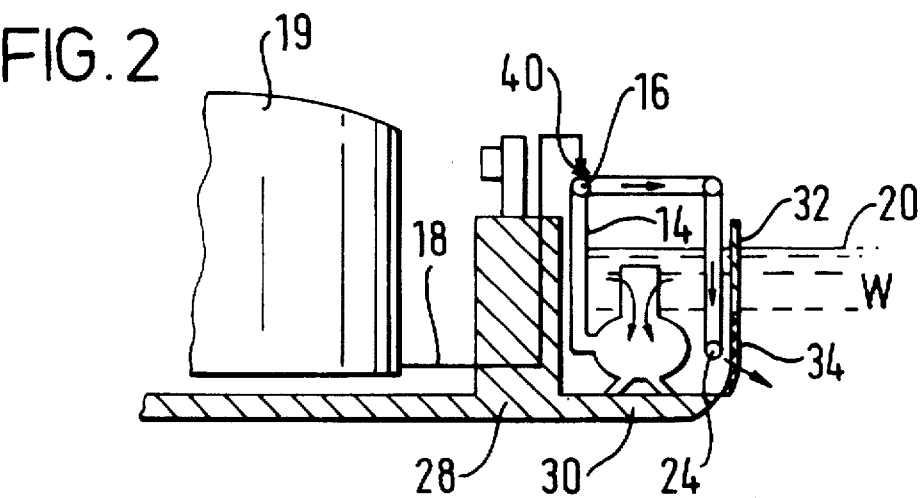
FIG. 2 is a partial cross sectional view of the present apparatus taken in the direction of arrows A—A in FIG. 1.
Figure 3:
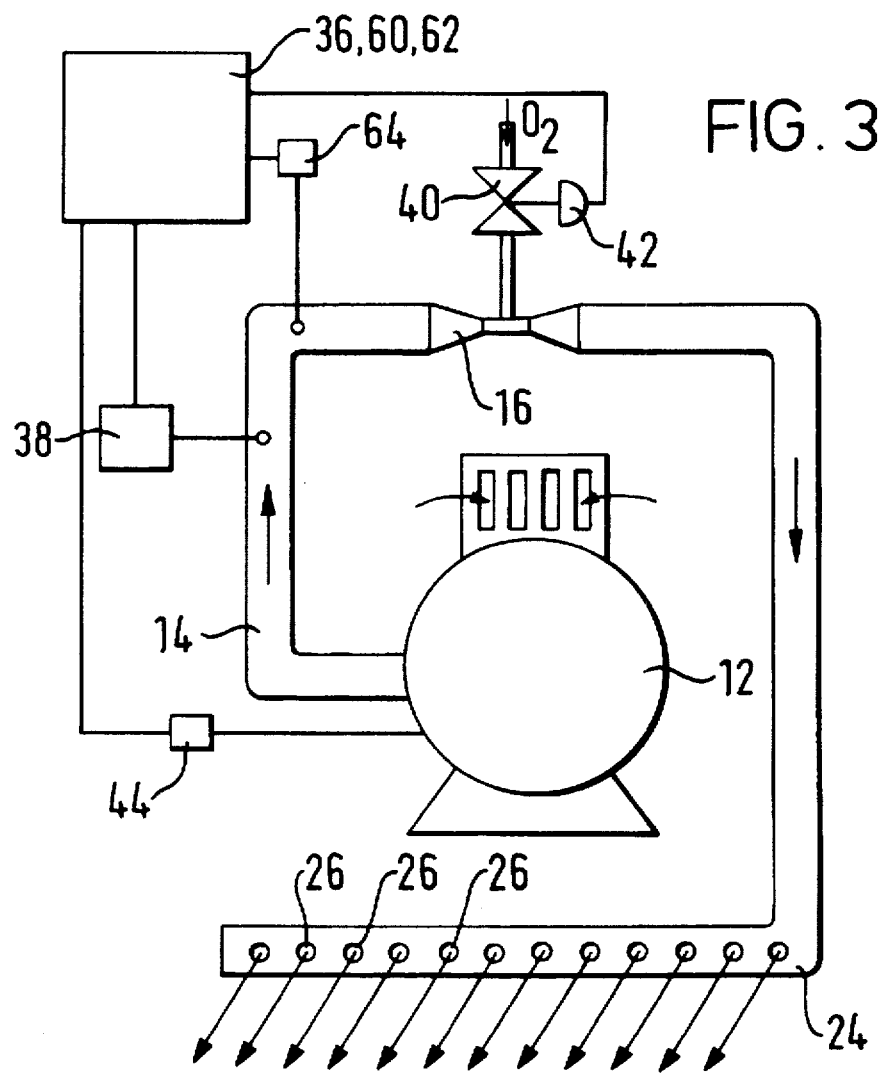
FIG. 3 is an enlarged view of a portion of the present invention taken in the direction of arrow B in FIG. 1.

Turning now briefly to FIGS. 2 and 3, from which it will be appreciated that submersible pump 12 acts to draw water from under the surface 20 thereof and directs it along conduit 14 towards the venturi device 16 conveniently positioned above the surface. The method of introducing oxygen into a liquid flow in such a venturi device is well known in the art and is, therefore, not described in detail herein. It is sufficient to say that oxygen is introduced under pressure into the throat portion 22 as the water is accelerated through therethrough and is dispensed therein due, at least in part, to the action of a shock wave created downstream thereof. Once oxygenated, the water is returned to the river via a sparge bar 24 having a plurality of outlet nozzles 26 each of which act to further mix the oxygen with the water and assist further dissolution of the oxygen.

As will be appreciated from FIGS. 1 and 2, the present apparatus 10 may be mounted on a floating platform or barge 28 in which case the pump and sparge bar arrangements may be provided on platforms 30 extending under the surface 20 of the river water W. In such an arrangement, it is beneficial to provide a baffle member 32 and mesh wall 34 to protect the apparatus 10 while still allowing water to be drawn from and returned to the river. Preferably, control is initiated over matched pairs of oxygen valves and/or motors with each pair being split so as to provide oxygenated water to respective sparge bars on opposite sides of the platform thereby to avoid any possible rotational effect associated with closing down just one sparge bar. A control system shown schematically at 36 acts in a manner to be described in detail later herein in conjunction with determining means 38 for determining the alpha factor of the water to initiate control over the pumping and/or oxygen supply. Control is initiated via oxygen valve and actuator 40, 42 and/or motor speed/operation control 44. Means 38 may comprise a simple apparatus for measuring the electrical conductivity or the total dissolved or undissolved solids concentration (TDS or TUS) of the liquid and thereby determining the alpha factor thereof. Such apparatus are well known in the art and therefore not described herein.

Once the conductivity (m siemens/cm), TDS/TUS (g/L) has been measured, the alpha factor can be determined by simple conversion well known to those skilled in the art. The determined alpha factor is then used to select the oxygen to water flow volume fraction necessary to achieve a required or desired oxygen dissolution efficiency. For example, referring to FIG. 4, a liquid having 9 g/L salt and an alpha factor of 1.8 would require an oxygen to water flow volume fraction of 13% in order to achieve an oxygen dissolution efficiency of 60%. It will be appreciated from FIG. 4 that there is a fairly large difference between the alpha factor of fresh water and water having a salt concentration of, for example, 9 g/L. In order to provide the highest practical oxygen dissolution efficiency in upstream, fresh water operation, the apparatus is designed for a 5% oxygen to water volume flow ratio (point $F_1$) at which an acceptable dissolution efficiency of approximately 60% is achieved.

If the air separation system is designed to produce 20 tons of oxygen per day (833 kg/hr), the required pumping rate would be 12,526 m³ of water per hour shared among all of the pumps 12. This allows the pump capacity for each of the ten pumps shown to be sized at 1,252 m³/hr. For such a pipework, venturi and sparge bar configuration it will be necessary to provide each pump with a motor rated at approximately 80 kW, giving a total pumping power requirement of 800 kW for operation in fresh water. It will be appreciated that if the apparatus is used to treat water having 9 g/L salt, the same dissolution efficiency may be achieved at an oxygen to water flow volume fraction of 13.0% ($F_2$). Consequently, one may reduce the water pumping rate (and hence the power consumption) without loss of dissolution efficiency while still utilizing the full output from the PSA plant. Such a reduction could be achieved by employing variable speed pumps 12 and reducing the power supplied thereto or one might simply cause one or more pumps 12 to be deactivated by isolating them from the power supply (not shown). The second of these two alternatives is preferred as variable speed pumps are more expensive and are, generally, less efficient at low flow rates. The power savings associated with such a control strategy are such that at a salt concentration of 15 grams per liter (slightly less than half the strength of sea water) only four of the ten pumps need be operated to dissolve the whole PSA output, reducing the pumping power requirement from 800 kW to just 320 kW.

Figure 4:
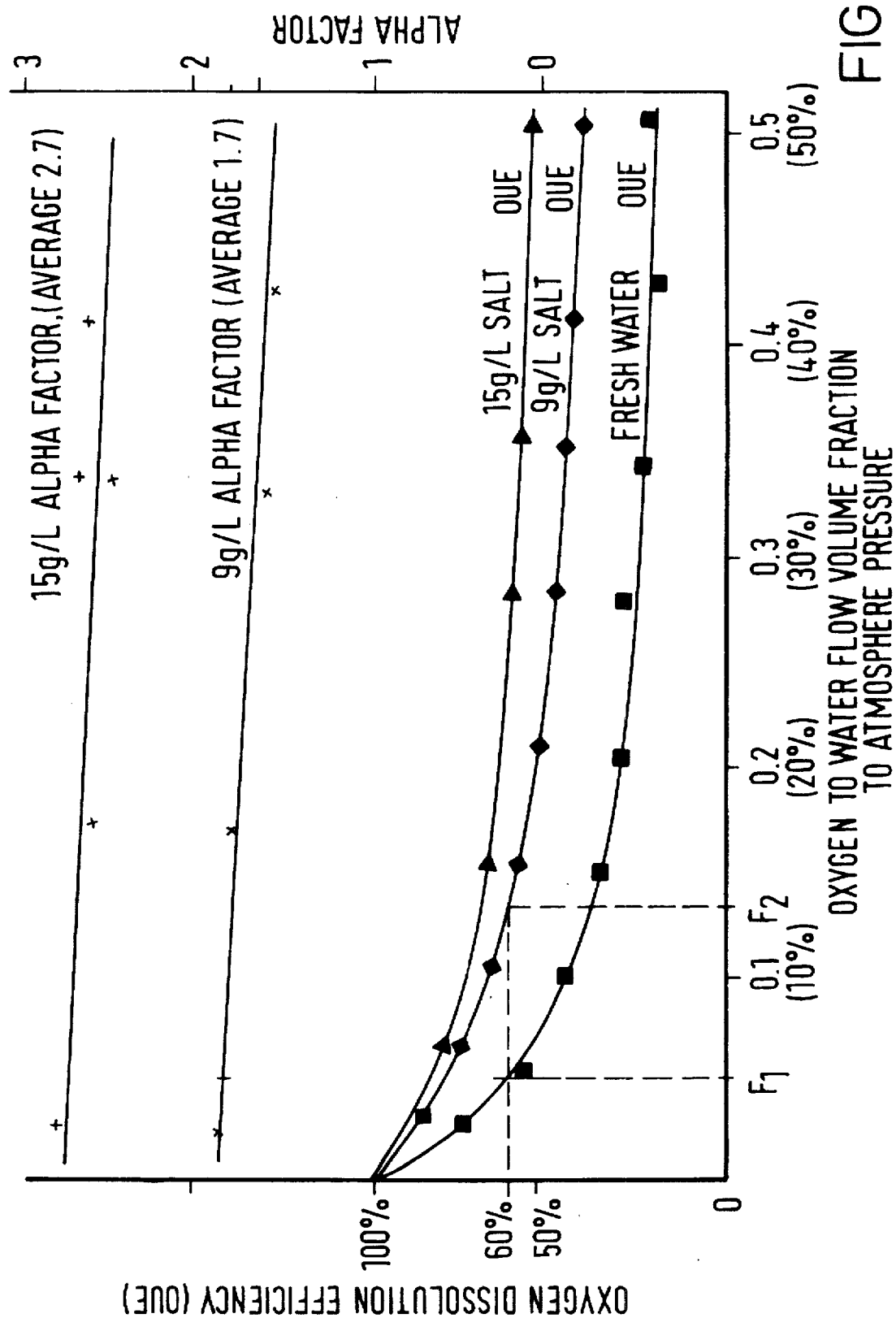
FIG. 4 is two graphs plotting against oxygen to water flow fraction against oxygen dissolution efficiency and alpha factor, respectively.

The control system for the above system has already been described to some extent but might also include some form of data storage means 60 for storing data on various liquids to be treated by the gas injection technique and comparison means 62 for comparing the determined alpha factor with the stored data to determine the required liquid flow rate through the apparatus. Typical examples of the type of data that would be stored are illustrated in FIG. 4 from which it will be appreciated that it would be necessary to store data relating to the oxygen dissolution efficiency at various oxygen to water flow volume fractions for a given number of water types of varying alpha factor. Processing of such data is fairly simple and control could be achieved by way of constant monitoring and adjustment or by periodic monitoring and adjustment.

The first of the two control techniques mentioned above is preferred when the apparatus 10 is used to oxygenate river water as the barge upon which it is positioned can often be called upon to oxygenate water at various points up and down the river, each of which has a different water alpha factor and/or salt saturation (g/L). Obviously, as the salinity of the water has a significant impact on the effective operation of the present apparatus, it is desirable to provide some form of real time salinity measurement if the apparatus is to be used to treat water having a variable salinity. Such devices are well known and comprise a salinity meter 64 for measuring the salinity of incoming water and providing the appropriate data to the control system for use in the above-mentioned manner. Since the conductivity is related to the alpha factor, it is not necessary for the control system to determine the alpha factor. The control system can instead be calibrated in terms of conductivity. Alternatively, if the apparatus 10 is to be used on a liquid having a fixed salinity the meter may be dispensed with and a fixed value (and hence dissolution efficiency curve) may be employed in the above process.

Another alternative approach might be to keep the pumping rate constant while varying the oxygen supply rate. Such an approach, while not being particularly beneficial if the cost of providing a variable oxygen supply are high might lend itself to use in a situation where pumping costs are low due to the presence of an inexpensive power supply or the use of a natural gravity feed system. Such an arrangement might be possible where the apparatus is used on land and for the treatment of industrial or domestic waste water. In such circumstances, the water/effluent would be drawn from an oxygenation tank or supply main (not shown). In general, the control system may be arranged so as to provide an optimum balance between maximising the gas dissolution efficiency and maximising the gas to liquid flow ratio.

Having described presently preferred embodiments of the invention, it is to be understood that it may be otherwise embodied within the scope of the appended claims.

We claim:

1. An apparatus for dissolving a gas in a liquid to form a liquid containing gas comprising:

gas introducing means, for introducing a flow of said gas into a liquid being transported on flotation means;

transportation means, comprising conduit means for transporting a quantity of the liquid being transported to a point in fluid flow communication with the gas flow from the gas introducing means;

determining means, for determining the alpha factor or parameter related thereto of the liquid being transported in said conduit means; and flow varying means, for varying the ratio of the gas flow to the liquid flow in relation to the determined alpha factor or parameter related thereto.

2. An apparatus in accordance with claim 1, wherein said gas introducing means comprises a venturi having a throat section and said gas is introduced at or adjacent the throat section.

3. An apparatus in accordance with claim 1 further comprising data storage means for storing data on various liquids to be treated and comparison means for comparing the measured alpha factor or parameter thereof with stored data, thereby determining the required flow rate of liquid through the apparatus.

4. An apparatus in accordance with claim 1, wherein said gas introducing means comprises a sub-atmospheric venturi.

5. The apparatus of claim 1 wherein the flow varying means comprises means for varying at least one of the liquid flow and the gas flow.

6. The apparatus of claim 1 wherein the flow varying means comprises means for varying the liquid flow.

7. An apparatus in accordance with claim 1, wherein the gas is oxygen and the liquid is water.

8. An apparatus in accordance with claim 7, further comprising an oxygen PSA apparatus operably connected to said gas introducing means for supplying gaseous oxygen to the gas introducing means.

9. An apparatus in accordance with claim 1, wherein the determining means comprises means for determining the alpha factor of the liquid.

10. An apparatus in accordance with claim 9, wherein the determining means comprises at least one of a) means for measuring the total dissolved or undissolved solids concentration of the liquid and b) means for determining the conductivity of the liquid, and means for determining the alpha factor therefrom.

11. An apparatus in accordance with claim 1, wherein the transportation means comprises a plurality of conduits for transporting the liquid, each having its own gas introducing means.

12. An apparatus in accordance with claim 11, wherein the transportation means further comprises at least one pump with each conduit including a separate pump for pumping the liquid therethrough.

13. An apparatus in accordance with claim 12, wherein the flow varying means comprises means for varying the pumping rate of one or more said pumps.

14. An apparatus in accordance with claim 13, wherein the flow varying means comprises means for independently activating or deactivating one or more of said pumps.

15. An apparatus in accordance with claim 11, wherein the transportation means further comprises a pump, said gas introducing means comprising a venturi, each conduit having a downstream termination point in a sparge bar to thereby form at least one pump/venturi/sparge bar combination.

16. The apparatus of claim 15 comprising multiple pump/venturi/sparge bar combinations.

17. An apparatus in accordance with claim 15 further comprising a platform upon which said apparatus is mounted, the sparge bars being positioned on opposite sides of said platform for discharging the liquid containing gas into any liquid upon which the platform is positionable, the flow varying means comprising means for simultaneous controlling pairs of said combinations.

18. An apparatus in accordance with claim 7, further comprising an oxygen PSA apparatus operably connected to said gas introducing means for supplying gaseous oxygen to the gas introducing means.

* * * * *